(12) United States Patent
Kondo et al.

(10) Patent No.: US 10,252,615 B2
(45) Date of Patent: Apr. 9, 2019

(54) CONTROL DEVICE FOR DRIVING FORCE TRANSMISSION DEVICE

(71) Applicant: JTEKT CORPORATION, Osaka (JP)

(72) Inventors: Hirokazu Kondo, Takahama (JP); Tomoaki Kato, Kariya (JP); Go Nagayama, Toyama (JP); Akiyoshi Kakita, Toyota (JP); Kotaro Sarai, Nishio (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/723,667

(22) Filed: Oct. 3, 2017

(65) Prior Publication Data

US 2018/0093566 A1 Apr. 5, 2018

(30) Foreign Application Priority Data

Oct. 4, 2016 (JP) .................................. 2016-196323

(51) Int. Cl.
*B60K 28/16* (2006.01)
*B60K 17/35* (2006.01)
(Continued)

(52) U.S. Cl.
CPC .............. *B60K 28/16* (2013.01); *B60K 17/02* (2013.01); *B60K 17/165* (2013.01); *B60K 17/35* (2013.01); *B60K 23/0808* (2013.01); *B60W 10/20* (2013.01); *B60W 30/02* (2013.01); *B60G 2800/215* (2013.01);
(Continued)

(58) Field of Classification Search
None
See application file for complete search history.

(56) References Cited

U.S. PATENT DOCUMENTS 4,884,653 A * 12/1989 Kouno ................. B60K 17/348
180/233
5,000,281 A * 3/1991 Nobumoto ........... B60K 28/165
180/197
(Continued)

FOREIGN PATENT DOCUMENTS

| FR | 2 958 608 A1 | 10/2011 |
|----|--------------|---------|
| JP | 7-195954 A   | 8/1995  |
| JP | 2009-166706  | 7/2009  |

OTHER PUBLICATIONS

Extended European Search Report dated Feb. 28, 2018 in Patent Application No. 17194285.7, citing documents AO and AP therein, 9 pages.

*Primary Examiner* — Dirk Wright
(74) *Attorney, Agent, or Firm* — Oblon, McClelland, Maier & Neustadt, L.L.P.

(57) ABSTRACT

A control device mounted on a four-wheel drive vehicle includes: a slip ratio calculating unit that obtains a slip ratio of main driving wheels based at least on wheel speeds; a smoothing unit that smooths the slip ratio by filtering; and a driving force control unit that controls a driving force transmission device so that a driving force that is transmitted to auxiliary driving wheels increases as the slip ratio smoothed by the smoothing unit increases. The smoothing unit uses a larger time constant for the filtering when a vehicle speed is less than a predetermined value than when the vehicle speed is equal to or higher than the predetermined value

2 Claims, 7 Drawing Sheets

(51) Int. Cl.
  *B60K 23/08* (2006.01)
  *B60W 10/20* (2006.01)
  *B60W 30/02* (2012.01)
  *B60K 17/02* (2006.01)
  *B60K 17/16* (2006.01)

(52) U.S. Cl.
  CPC ............ *B60K 2023/0858* (2013.01); *B60K 2023/0875* (2013.01); *B60W 2510/20* (2013.01); *B60W 2520/10* (2013.01); *B60Y 2400/424* (2013.01)

(56) References Cited

U.S. PATENT DOCUMENTS

| | | | | |
|---|---|---|---|---|
| 6,564,140 B2 * | 5/2003 | Ichikawa | ............ | B60K 23/0808 180/197 |
| 6,584,399 B2 * | 6/2003 | Koibuchi | ............... | B60K 28/16 180/197 |
| 6,634,451 B2 * | 10/2003 | Sakakiyama | ...... | B60K 23/0808 180/197 |
| 7,987,029 B2 * | 7/2011 | Takenaka | .............. | B60T 8/1755 116/36 |
| 9,199,639 B2 * | 12/2015 | Yamakado | ............ | B60T 8/1755 |
| 9,296,374 B2 * | 3/2016 | Yamakado | ............... | B60L 3/102 |
| 9,333,970 B2 * | 5/2016 | Kato | ........................ | B60L 15/20 |
| 9,540,003 B2 * | 1/2017 | Yamakado | ........... | B60W 40/107 |
| 9,849,782 B2 * | 12/2017 | Elliott | .................... | F16H 61/47 |
| 9,919,603 B2 * | 3/2018 | Yamakado | ................ | B60L 7/18 |
| 2016/0016581 A1 * | 1/2016 | Yokota | ................. | B60W 10/04 701/41 |

\* cited by examiner

CONTROL DEVICE FOR DRIVING FORCE TRANSMISSION DEVICE

INCORPORATION BY REFERENCE

The disclosure of Japanese Patent Application No. 2016-196323 filed on Oct. 4, 2016 including the specification, drawings and abstract, is incorporated herein by reference in its entirety.

BACKGROUND OF THE INVENTION

1. Field of the Invention

The present invention relates to control devices for driving force transmission devices which are mounted on four-wheel drive vehicles.

2. Description of the Related Art

Conventionally, four-wheel drive vehicles having main driving wheels and auxiliary driving wheels have mounted thereon a driving force transmission device and a control device that controls the driving force transmission device. The driving force transmission device can adjust a driving force that is transmitted to the auxiliary driving wheels. The control device controls the driving force transmission device according to the traveling state such as a driving force generated by a driving source such as an engine and the rotational speed difference between front and rear wheels. See, e.g., Japanese Patent Application Publication No. 2009-166706 (JP 2009-166706 A).

A control device (drive control device) described in JP 2009-166706 A controls the driving force transmission device based on the slip ratio that is a ratio between the vehicle bod speed and the wheel speed of the main driving wheel. More specifically, the control device refers to a region map divided into a four-wheel drive region and a two-wheel drive region by a drive method switching threshold represented by correlation between the slip ratio of the main driving wheels and the vehicle body speed. When the slip ratio is higher than the drive method switching threshold, the control device switches the four-wheel drive vehicle to a four-wheel drive mode, namely a mode in which the driving force of the driving source is transmitted to the auxiliary driving wheels.

In view of the fact that a calculation error of the slip ratio is large when a four-wheel drive vehicle is traveling at low speeds, the control device described in JP 2009-166706 A always sets the drive mode to the four-wheel drive mode in order to provide driving stability, when the vehicle body speed is equal to or lower than a predetermined value.

According to the control device described in JP 2009-166706 A, when the vehicle body speed is equal to or lower than the predetermined value, the four-wheel drive vehicle always travel in the four-wheel drive mode regardless of the road surface friction coefficient. Accordingly, fuel efficiency may be reduced or the tight corner braking phenomenon may occur when the four-wheel drive vehicle is traveling at low speeds. In the case where the driving force transmission device is controlled based on the slip ratio even when the four-wheel drive vehicle is traveling at low speeds, the driving force that is transmitted to the auxiliary driving wheels varies significantly due to a calculation error of the slip ratio. This may reduce driving stability.

SUMMARY OF THE INVENTION

It is one object of the present invention to provide a control device for a driving force transmission device which can control, based on a slip ratio of main driving wheels of a four-wheel drive vehicle, a driving force transmission device that transmits a driving force to auxiliary driving wheels of the four-wheel drive vehicle and can transmit an appropriate driving force to the auxiliary driving wheels even when the four-wheel drive vehicle is traveling at low speeds.

A control device for a driving force transmission device according to one aspect of the present invention is a control device for a driving force transmission device which is mounted on a four-wheel drive vehicle having a main driving wheel to which a driving force of a driving source of the vehicle is constantly transmitted and an auxiliary driving wheel to which the driving force of the driving source is adjustably transmitted according to a traveling state of the vehicle via the driving force transmission device, and which controls the driving force transmission device. The control device includes: a slip ratio calculating unit that obtains a slip ratio of the main driving wheel based at least on a wheel speed of the main driving wheel; a smoothing unit that performs filtering to smooth the slip ratio obtained by the slip calculating unit; and a driving force control unit that controls the driving force transmission device so that the driving force that is transmitted to the auxiliary driving wheel increases as the slip ratio smoothed by the smoothing unit increases. The smoothing unit uses a larger time constant for the filtering when a vehicle speed is less than a predetermined value than when the vehicle speed is equal to or higher than the predetermined value.

According to the above aspect, the control device for the driving force transmission device can control, based on the slip ratio of the main driving wheel, the driving force that is transmitted to the auxiliary driving wheel and can transmit an appropriate driving force to the auxiliary driving wheel even when the vehicle is traveling at low speeds.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the present invention will be described with reference to FIGS. 1 to 5.

Figure 1:
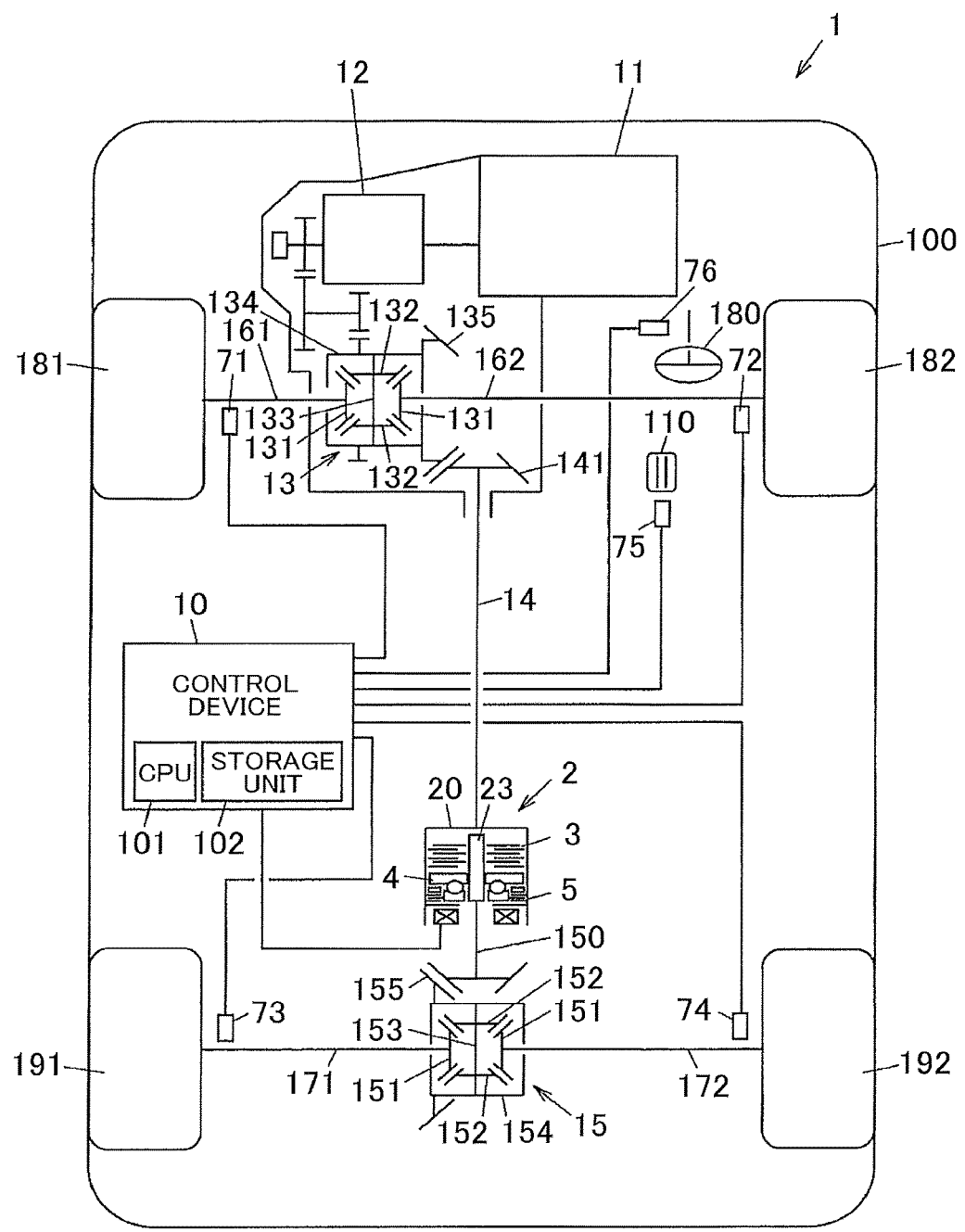
FIG. 1 is a schematic configuration diagram showing an example of the configuration of a four-wheel drive vehicle having mounted thereon a driving force transmission device according to a first embodiment of the present invention.

FIG. 1 is a schematic configuration diagram showing an example of the configuration of a four-wheel drive vehicle having mounted thereon a driving force transmission device according to the first embodiment of the present invention.

As shown in FIG. 1, a four-wheel drive vehicle 1 includes a vehicle body 100, an engine 11, a transmission 12, right and left front wheels 182, 181, and right and left rear wheels 192, 191. The engine 11 serves as a driving source that generates torque for driving the four-wheel drive vehicle 1. The transmission 12 shifts the output from the engine 11. The right and left front wheels 182, 181 serve as main driving wheels to which the driving force from the engine 11 shifted by the transmission 12 is constantly transmitted. The right and left rear wheels 192, 191 serve as auxiliary driving wheels to which the driving force of the engine 11 is transmitted according to the traveling state of the four-wheel drive vehicle 1. The four-wheel drive vehicle 1 can switch between a four-wheel drive mode and a two-wheel drive mode. The four-wheel drive mode is a mode in which the driving force of the engine 11 is transmitted to the right and left front wheels 182, 181 and the right and left rear wheels 192, 191. The two-wheel drive mode is a mode in which the driving force of the engine 11 is transmitted only to the right and left front wheels 182, 181.

The four-wheel drive device 1 further includes a front differential 13, a propeller shaft 14, a rear differential 15, right and left front-wheel drive shafts 162, 161, right and left rear-wheel drive shafts 172, 171, a driving force transmission device 2, and a control device 10. The driving force transmission device 2 is disposed between the propeller shaft 14 and the rear differential 15. The control device 10 controls the driving force transmission device 2.

The control device 10 can obtain the detection results of rotational speed sensors 71 to 74, an accelerator pedal sensor 75, and a steering angle sensor 76. The rotational speed sensors 72, 71 detect the rotational speeds of the right and left front wheels 182, 181, respectively, and the rotational speed sensors 74, 73 detect the rotational speeds of the right and left rear wheels 192, 191, respectively. The accelerator pedal sensor 75 detects the amount by which an accelerator pedal 110 is depressed. The steering angle sensor 76 detects the rotational angle (steering angle) of a steering wheel 180. The control device 10 controls the driving force transmission device 2 based on the obtained detection results. More specifically, for example, the control device 10 controls the driving force transmission device 2 so that a larger driving force is transmitted to the right and left rear wheels 192, 191 as the difference between the average rotational speed of the right and left front wheels 182, 181 and the average rotational speed of the right and left rear wheels 192, 191 increases and as the amount by which the accelerator pedal 110 is depressed increases.

The rotational speed sensors 71 to 74 are, for example, magnetic sensors each detecting a magnetic pole of a pulser ring fixed to a hub wheel of a hub unit that rotates with a wheel. The control device 10 can detect the rotational speed of each wheel by counting the number of times the magnetic pole changes within a predetermined period of time based on the output signals of the rotational speed sensors 71 to 74.

The control device 10 calculates command torque to be transmitted by the driving force transmission device 2, based on the detection results of the rotational speed sensors 71 to 74, the accelerator pedal sensor 75, and the steering angle sensor 76 etc., and supplies an excitation current according to the command torque to the driving force transmission device 2. The driving force transmission device 2 transmits a driving force according to the excitation current from the propeller shaft 14 toward the rear differential 15. The control device 10 can adjust the driving force that is transmitted to the right and left rear wheels 192, 191 via the driving force transmission device 2, by increasing or decreasing the excitation current by, e.g., pulse width modulation (PWM) control.

The driving force of the engine 11 is transmitted to the right and left front wheels 182, 181 via the transmission 12, the front differential 13, and the right and left front-wheel drive shafts 162, 161. The front differential 13 has a pair of side gears 131, a pair of pinion gears 132, a pinion gear shaft 133, and a front differential case 134. The pair of side gears 131 are coupled to the right and left front-wheel drive shafts 162, 161 such that the pair of side gears 131 cannot rotate relative to the right and left front-wheel drive shafts 162, 161. The pair of pinion gears 132 mesh with the pair of side gears 131 such that the gear axes of the pinion gears 132 extend perpendicularly to the gear axes of the side gears 131. The pinion gear shaft 133 supports the pair of pinion gears 132. The front differential case 134 accommodates the pair of side gears 131, the pair of pinion gears 132, and the pinion gear shaft 133.

A ring gear 135 is fixed to the front differential case 134 and meshes with a pinion gear 141. The pinion gear 141 is disposed at an end of the propeller shaft 14 which is located on the front side of the vehicle. An end of the propeller shaft 14 which is located on the rear side of the vehicle is coupled to a housing 20 of the driving force transmission device 2. The driving force transmission device 2 has an inner shaft 23. The inner shaft 23 is disposed such that the inner shaft 23 can rotate relative to the housing 20. The driving force transmission device 2 transmits the driving force according to the excitation current supplied from the control device 10 to the rear differential 15 via a pinion gear shaft 150. The pinion gear shaft 150 is coupled to the inner shaft 23 such that the pinion gear shaft 150 cannot rotate relative to the inner shaft 23. The driving force transmission device 2 will be described in detail later.

The rear differential 15 has a pair of side gears 151, a pair of pinion gears 152, a pinion gear shaft 153, a rear differential case 154, and a ring gear 155. The pair of side gears 151 are coupled to the right and left rear-wheel drive shafts 172, 171 such that the pair of side gears 151 cannot rotate relative to the right and left rear-wheel drive shafts 172, 171. The pair of pinion gears 152 mesh with the pair of side gears 151 such that the gear axes of the pinion gears 152 extend perpendicularly to the gear axes of the side gears 151. The pinion gear shaft 153 supports the pair of pinion gears 152. The rear differential case 154 accommodates the pair of side gears 151, the pair of pinion gears 152, and the pinion gear shaft 153. The ring gear 155 is fixed to the rear differential case 154 and meshes with the pinion gear shaft 150.

Figure 2:
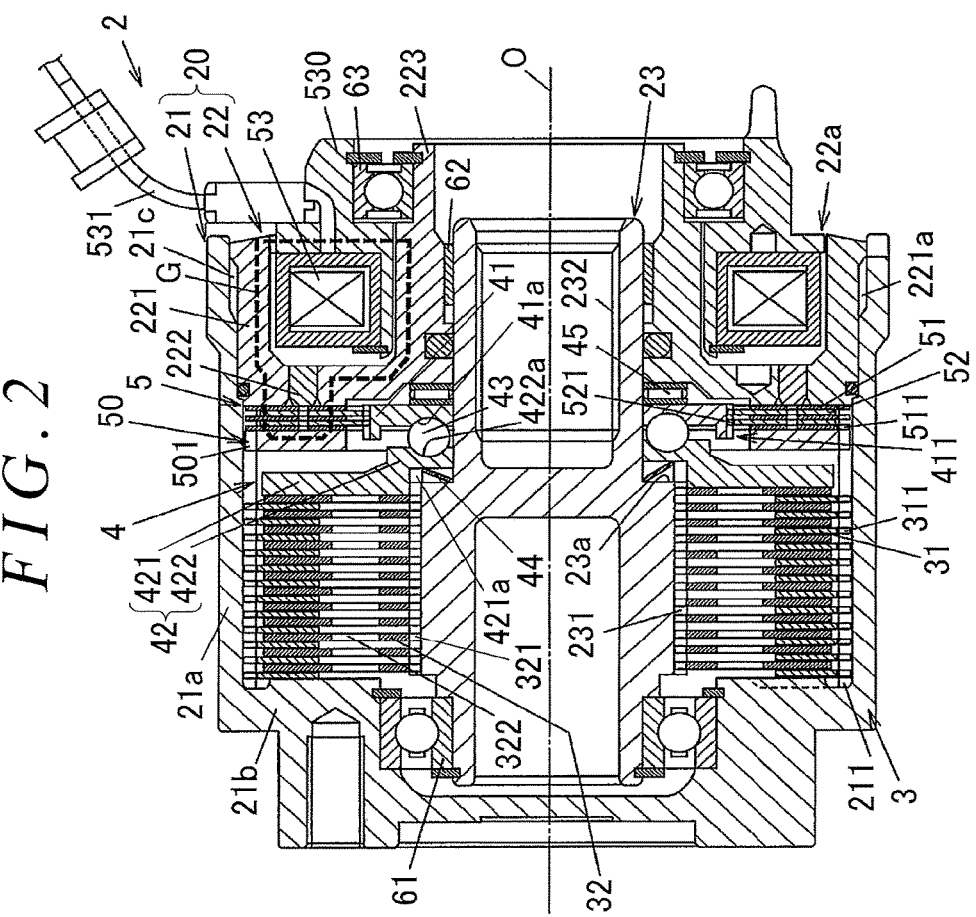
FIG. 2 is a sectional view showing an example of the configuration of the driving force transmission device.

FIG. 2 is a sectional view showing an example of the configuration of the driving force transmission device 2. In FIG. 2, the driving force transmission device 2 in an operating state (state in which the driving force transmission device 2 transmits torque) is shown above a rotation axis O, and the driving force transmission device 2 in a non-operating state (state in which the driving force transmission device 2 does not transmit torque) is shown below the rotation axis O. Hereinafter, a direction parallel to the rotation axis O is referred to as the axial direction.

The driving force transmission device 2 has the housing 20, the tubular inner shaft 23, a main clutch 3, a cam mechanism 4, and an electromagnetic clutch mechanism 5. The housing 20 is formed by a front housing 21 and a rear housing 22 and serves as an outer rotary member. The tubular inner shaft 23 is supported coaxially with the housing 20 such that the inner shaft 23 can rotate relative to the housing 20. The tubular inner shaft 23 serves as an inner rotary member. The main clutch 3 transmits a driving force between the housing 20 and the inner shaft 23. The cam mechanism 4 generates a pressing force that presses the main clutch 3. The electromagnetic clutch mechanism 5 receives a rotational force of the front housing 21 and operates the cam mechanism 4. Lubricating oil, not shown, is enclosed in the interior space of the housing 20. The cam mechanism 4 is one form of a pressing mechanism that applies a pressing force to the main clutch 3.

The front housing 21 is a single-piece member formed by a cylindrical tubular portion 21a and a bottom portion 21b and has a bottomed cylindrical shape. The tubular portion 21a has an internally threaded portion 21c on the inner surface of its opening end. The front housing 21 is made of a nonmagnetic metal material such as aluminum. The propeller shaft 14 (see FIG. 1) is coupled to the bottom portion 21b via, e.g., a cross joint.

The front housing 21 has a plurality of inner peripheral spline projections 211 on the inner peripheral surface of the tubular portion 21a. The inner peripheral spline projections 211 extend in the axial direction and project radially inward toward the rotation axis O (see FIG 2) of the housing 20 and the inner shaft 23.

The rear housing 22 is formed by a first annular member 221, a second annular member 222, and a third annular member 223. The first annular member 221 is made of a magnetic material such as iron. The second annular member 222 is made of a nonmagnetic material such as austenitic stainless steel and is joined to the inner periphery of the first annular member 221 by welding etc. The third annular member 223 is made of a magnetic material such as iron and is joined to the inner periphery of the second annular member 222 by welding etc. An annular accommodating space 22a that accommodates an electromagnetic coil 53 is formed between the first annular member 221 and the third annular member 223. The first annular member 221 has an externally threaded portion 221a on its outer peripheral surface. The externally threaded portion 221a is screwed in the internally threaded portion 21c of the front housing 21.

The inner shaft 23 is supported by the inner periphery of the housing 20 via a bail bearing 61 and a needle roller bearing 62. The inner shaft 23 has a plurality of outer peripheral spline projections 231 on its outer peripheral surface. The outer peripheral spline projections 231 extend in the axial direction. The inner shaft 23 further has a spline fitting portion 232 on the inner surface of its one end. The pinion gear shaft 150 (see FIG. 1) has its one end fitted in the spline fitting portion 232 such that the pinion gear shaft 150 cannot rotate relative to the inner shaft 23.

The main clutch 3 is a friction clutch having a plurality of main outer clutch plates 31 and a plurality of main inner clutch plates 32. The main outer clutch plates 31 and the main inner clutch plates 32 are arranged alternately in the axial direction. Lubricating oil, not shown, enclosed between the housing 20 and the inner shaft 23 reduces sliding friction between the main outer and inner clutch plates 31, 32, thereby restraining wear and seizing of the main outer clutch plates 31 and the main inner clutch plates 32.

Each of the main outer clutch plates 31 has a plurality of engaging projections 311 along its outer peripheral edge. The engaging projections 311 engage with the inner peripheral spline projections 211 of the front housing 21. The engagement of the engaging projections 311 of the main outer clutch plates 31 with the inner peripheral spline projections 211 of the front housing 21 restricts rotation of the main outer clutch plates 31 relative to the front housing 21 and allows the main outer clutch plates 31 to move in the axial direction with respect to the front housing 21.

Each of the main inner clutch plates 32 has a plurality of engaging projections 321 along its inner peripheral edge. The engaging projections 321 engage with the outer peripheral spline projections 231 of the inner shaft 23 with backlash in the circumferential direction therebetween. Each of the main inner clutch plates 32 has a plurality of oil holes 322 formed radially inside the main outer clutch plates 31, and lubricant oil flows through the oil holes 322. The engagement of the engaging projections 321 of the main inner clutch plates 32 with the outer peripheral spline projections 231 of the inner shaft 23 restricts rotation of the main inner clutch plates 32 relative to the inner shaft 23 and allows the main inner clutch plates 32 to move in the axial direction with respect to the inner shaft 23.

The cam mechanism 4 has a pilot cam 41, a main cam 42, and a plurality of spherical cam balls 43. The pilot cam 41 receives a rotational force of the housing 20 via the electromagnetic clutch mechanism 5. The main cam 42 serves as a pressing member that presses the main clutch 3 in the axial direction. The cam balls 43 are disposed between the pilot cam 41 and the main cam 42.

The main cam 42 is a single-piece member formed by a disc-shaped pressing portion 421 and a cam portion 422. The pressing portion 421 is in contact with the main inner clutch plate 32 located at one end of the main clutch 3 and presses the main clutch 3. The cam portion 422 is disposed on the inner peripheral side of the main cam 42 with respect to the pressing portion 421. The pressing portion 421 has a spline engagement portion 421a in its inner peripheral end. The spline engagement portion 421a engages with the outer peripheral spline projections 231 of the inner shaft 23. This engagement of the spline engagement portion 421a with the outer peripheral spline projections 231 of the inner shaft 23 restricts rotation of the main cam 42 relative to the inner shaft 23. A disc spring 44 is disposed between the main cam 42 and a stepped surface 23a of the inner shaft 23. The disc spring 44 biases the main cam 42 away from the main clutch 3 in the axial direction.

The pilot cam 41 has a spline engagement portion 411 in its outer peripheral end. The spline engagement portion 411 receives from the electromagnetic clutch mechanism 5 a rotational force that causes the pilot cam 41 to rotate relative to the main cam 42. A thrust needle roller bearing 45 is disposed between the pilot cam 41 and the third annular member 223 of the rear housing 22.

The pilot cam 41 has a plurality of cam grooves 41a in its surface facing the cam portion 422 of the main cam 42, and the cam portion 422 of the main cam 42 has a plurality of cam grooves 422a in its surface facing the pilot cam 41. Each of the cam grooves 41a, 422a is formed so that its axial depth varies in the circumferential direction. The cam balls 43 are disposed between each cam groove 41a of the pilot cam 41 and each cam groove 422a of the main cam 42. As the pilot cam 41 rotates relative to the main cam 42, the cam mechanism 4 generates an axial pressing force that presses the main clutch 3. As the main clutch 3 receives the pressing force from the cam mechanism 4, the main outer clutch plates 31 and the main inner clutch plates 32 frictionally contact each other. The main clutch 3 thus transmits a driving force by this frictional force.

The electromagnetic clutch mechanism 5 has an armature 50, a plurality of pilot outer clutch plates 51, a plurality of pilot inner clutch plates 52, and the electromagnetic coil 53.

The electromagnetic coil 53 is held by an annular yoke 530 that is made of a magnetic material. The electromagnetic coil 53 is accommodated in the accommodating space 22a of the rear housing 22. The yoke 530 is supported by the third annular member 223 of the rear housing 22 via a ball bearing 63. The outer peripheral surface of the yoke 530 faces the inner peripheral surface of the first annular member 221, and the inner peripheral surface of the yoke 530 faces the outer peripheral surface of the third annular member 223. An excitation current is supplied from the control device 10 to the electromagnetic coil via an electrical wire 531.

The plurality of pilot outer clutch plates 51 and the plurality of pilot inner clutch plates 52 are arranged alternately in the axial direction between the armature 50 and the rear housing 22. Each of the pilot outer clutch plates 51 and the pilot inner clutch plates 52 has a plurality of arc-shaped slits in its central portion in the radial direction in order to prevent short-circuiting of magnetic flux that is generated by application of the current to the electromagnetic coil 53.

Each of the pilot outer clutch plates 51 has a plurality of engaging protections 511 along its outer peripheral edge. The engaging projections 511 engage with the inner peripheral spline projections 211 of the front housing 21. Each of the pilot inner clutch plates 52 has a plurality of engaging projections 521 along its inner peripheral edge. The engaging projections 521 engage with the spline engagement portion 411 of the pilot cam 41.

The armature 59 is an annular member made of a magnetic material such as iron and has a plurality of engaging projections 501 in its outer peripheral portion. The engaging projections 501 engage with the inner peripheral spline projections 211 of the front housing 21. This engagement of the engaging protections 501 with the inner peripheral spline projections 211 of the front housing 21 allows the armature 50 to move in the axial direction with respect to the front housing 21 and restricts rotation of the armature 50 relative to the front housing 21.

In the driving force transmission device 2 configured as described above, the armature 50 is attracted toward the rear housing 22 by a magnetic force that is generated when an excitation current is supplied to the electromagnetic coil 53, so that the pilot outer clutch plates 51 and the pilot inner clutch plates 52 frictionally contact each other. The rotational force of the housing 20 is thus transmitted to the pilot cam 41, the pilot cam 41 rotates relative to the main cam 12, and the cam balls 43 roll in the cam grooves 41a, 422a. Due to this rolling motion of the cam balls 43, the main cam 42 is subjected so inner peripheral thrust that presses the main clutch 3. A frictional force is thus generated between the plurality of main outer clutch plates 31 and the plurality of main inner clutch plates 32. Torque is transmitted between the housing 20 and the inner shaft 23 by this frictional force. the torque that is transmitted by the main clutch 3 varies according to the excitation current that is supplied to the electromagnetic coil 53.

The control device 10 has a central processing unit (CPU) 101 and a storage unit 102. The CPU 101 is an arithmetic processing unit. The storage unit 102 is formed by a semiconductor memory device such as a read only memory (ROM) or a random access memory (RAM). The CPU 101 runs programs stored in the storage unit 102.

Figure 3:
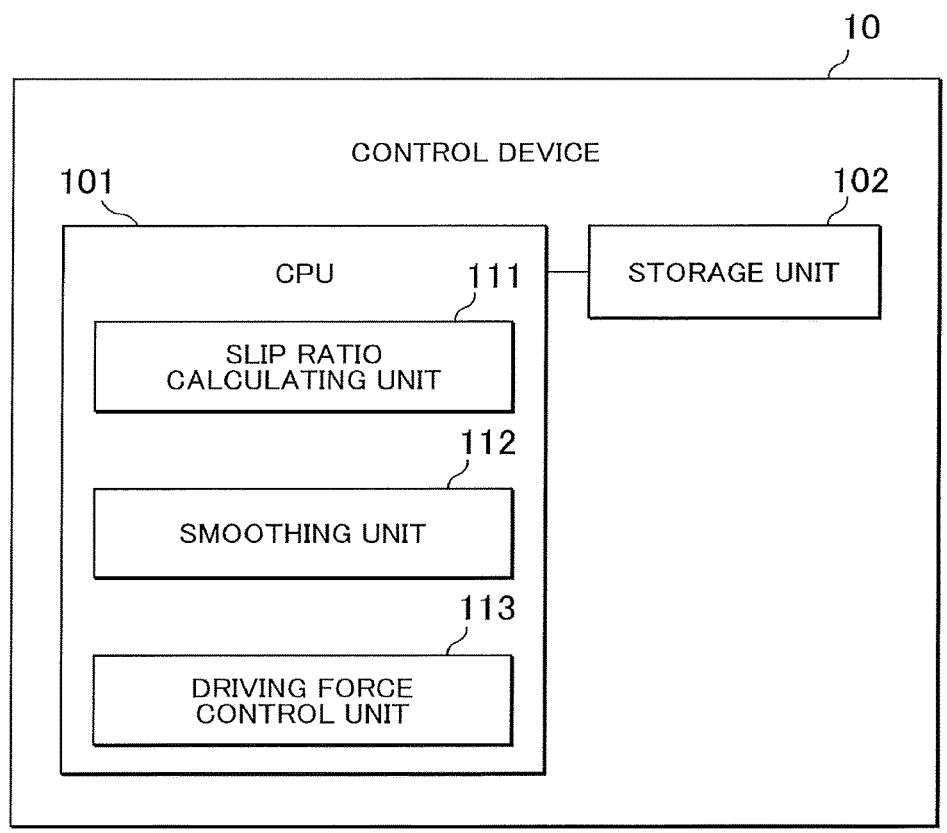
FIG. 3 is a functional block diagram showing the functional configuration of a control device.

FIG. 3 is a functional block diagram showing the functional configuration of the control device 10. The CPU 101 functions as a slip ratio calculating unit 111, a smoothing unit 112, and a driving force control unit 113 by running the programs stored in the storage unit 102.

Although the control device 10 has many functions in addition to the functions implemented by these functional units, a process of controlling a driving force that is transmitted to the right and left rear wheels 192, 191 serving as the auxiliary driving wheels, based on the slip ratios of the right and left front wheels 182, 181 serving as the main driving wheels will be mainly described here.

The slip ratio calculating unit 111 obtains the slip ratios of the right and left front wheels 182, 181 based at least on the wheel speeds of the right and left front wheels 182, 181. In the present embodiment, as given by the following expression (1), the slip ratio δ1 of the left front wheel 181 is calculated based on the vehicle body speed v, the wheel speed ω1 of the left front wheel 181, and the turning correction term Φ that is determined according to the steering angle φ. As given by the following expression (2), the slip ratio δ2 of the right front wheel 182 is calculated based on the vehicle body speed v, the wheel speed ω2 of the right front wheel 182, and the turning correction term Φ. One of the slip ratios δ1, δ2 which has a higher value is selected as the slip ratio δ of the main driving wheels which is to be used in the subsequent processing.

$$\delta 1 = \left(1 - \frac{v}{\omega 1}\right) - \Phi \qquad (1)$$

$$\delta 2 = \left(1 - \frac{v}{\omega 2}\right) - \Phi \qquad (2)$$

The vehicle body speed v refers to the speed at which the vehicle body 100 is moving based on the assumption that the right and left front wheels 182, 181 and the right and left rear wheels 192, 191 are not slipping. For example, the vehicle body speed v can be obtained based on the rotational speed of one of the right and left front wheels 182, 181 and the right and left rear wheels 192, 191 which is rotating at the lowest speed. The wheel speed ω1 refers to the vehicle speed based on the assumption that the wheels are not slipping, and this vehicle speed is obtained based on the rotational speed of the left front wheel 181 and the wheel diameter thereof. The turning correction term Φ is used to correct the influence of the rotational speed difference between the front and rear and right and left wheels due to turning.

For example, at the steering angle φ of zero (turning correction term Φ=0), the slip ratio δ1 of the left front wheel 181 is 1 when the left front wheel 181 is spinning (wheel speed ω1>0) while the four-wheel drive vehicle 1 is being stopped (vehicle body speed v=0), and the slip ratio δ1 of the left front wheel 181 is 0 when the left front wheel 181 is not slipping. The same applies to the slip ratio δ2 of the right front wheel 182.

The smoothing unit 112 performs filtering to smooth the slip ratio δ obtained by the slip ratio calculating unit 111. Specifically, this filtering is low pass filtering that smooths an abrupt change in filter output value. This filtering can be performed by a digital filtering operation of calculating, e.g., a weighted moving average of the slip ratios δ obtained at predetermined time intervals according to the elapsed time and the time constant. The smoothing unit 112 uses a larger time constant for the filtering when the vehicle speed is less than a predetermined value than when the vehicle speed is equal to or higher than the predetermined value.

Figure 4:
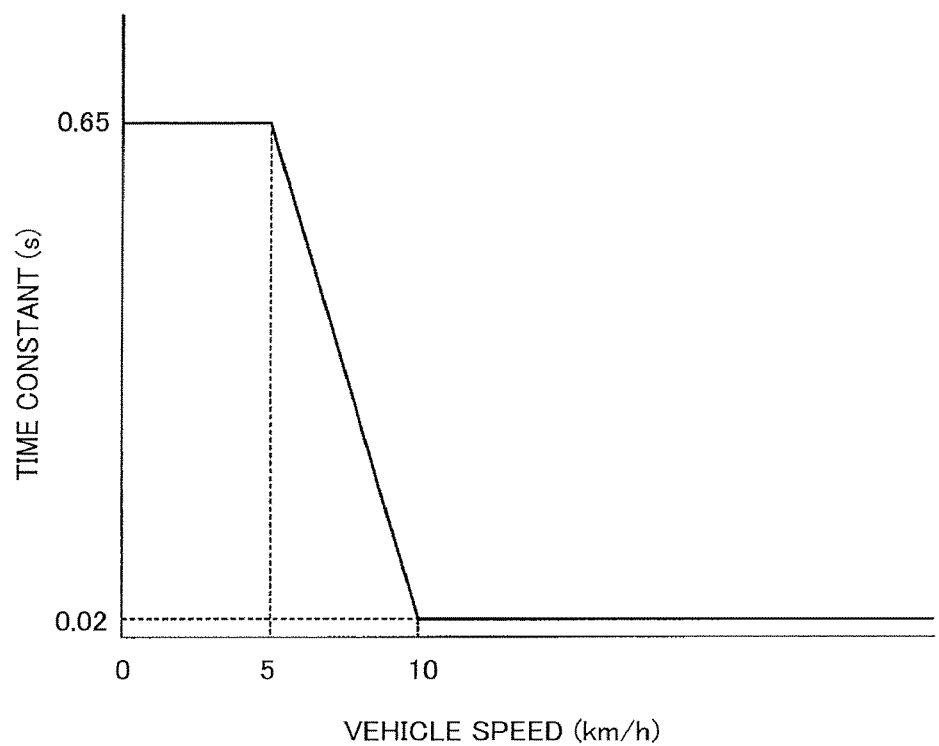
FIG. 4 is a graph showing an example of the relationship between the time constant for filtering that is performed by a smoothing unit and the vehicle speed.

FIG. 4 is a graph (map) showing an example of the relationship between the time constant for the filtering that is performed by the smoothing unit 112 and the vehicle speed. In FIG. 4, the abscissa represents the vehicle speed (km/h) and the ordinate represents the time constant(s). In the present embodiment, the vehicle body speed v is used as the vehicle speed. The time constant is herein defined as the amount of time (in seconds) required for the filter output value to increase to 0.632 (63.2% of the filter input value) when the slip ratio δ, which is the filter input value, changes, e.g., from 0 to 1 in a stepped manner.

In the example shown in FIG. 4, the time constant is constant at 0.02 (s) when the vehicle speed is equal to or higher than a first predetermined value that is 10 km/h, and the time constant is constant at 0.65 (s) when the vehicle speed is less than a second predetermined value that is 5 km/h. The time constant changes between 0.02 and 0.65 at a fixed rate when the vehicle speed is less than the first predetermined value and is equal to or higher than the second predetermined value. As described above, the smoothing unit 112 uses a larger time constant for the filtering when the vehicle speed is less than the first predetermined value (10 km/h) than when the vehicle speed is equal to or higher than the first predetermined value, and thus smooths a change in filter output value (hereinafter, the slip ratio as a smoothed filter output value is referred to as the "slip ratio δ'") with respect to a change in slip ratio δ as a filter input value. The storage unit 102 stores therein the relationship between the time constant and the vehicle speed, which is shown in FIG. 4, in the form of, e.g., a map.

The driving force control unit 113 controls the driving force transmission device 2 so that the driving force that is transmitted to the right and left rear wheels 192, 191 increases as the slip ratio δ' increases. Specifically, the driving force control unit 113 calculates command torque so that the driving force to be transmitted by the driving force transmission device 2 increases as the slip ratio δ' increases. The driving force control unit 113 supplies an excitation current according to the command torque to the electromagnetic coil 53 of the driving force transmission device 2. Accordingly, when one or both of the right and left front wheels 182, 181 slip, the proportion of the driving force that is distributed to the right and left rear wheels 192, 191 increases, which restrains slip of the right and left front wheels 182, 181.

Figure 5:
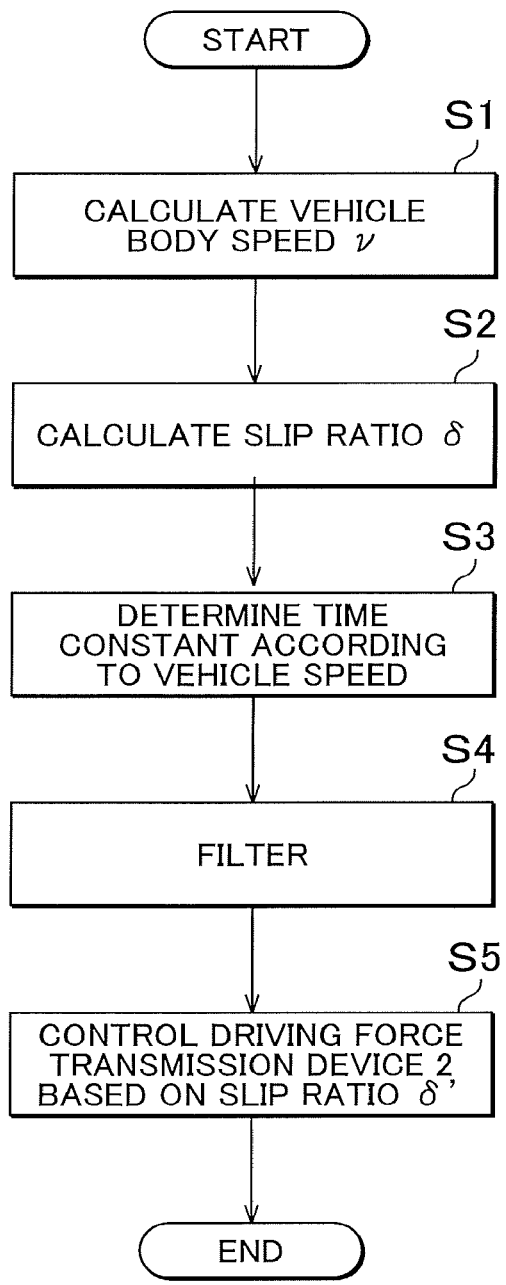
FIG. 5 is a flowchart showing an example of the execution procedure of a process that is executed by a central processing unit (CPU) of the control device which functions as a slip ratio calculating unit, a smoothing unit, and a driving force control unit.

FIG. 5 is a flowchart showing an example of the execution procedure of a process that is executed by the CPU 101 functioning as the slip ratio calculating unit 111, the smoothing unit 112, and the driving force control unit 113. The CPU 101 repeatedly executes the process shown in this flowchart every predetermined control period (e.g., 5 ms).

In a single control period, the CPU 101, which functions as the slip ratio calculating unit 111, first calculates the vehicle body speed v (step S1), and obtains the slip ratios δ1, δ2 by calculation given by the above expressions (1), (2) and selects one of the slip ratios δ1, δ2 which has a higher value as the slip ratio δ of the main driving wheels (step S2).

Next, the CPU 101, which functions as the smoothing unit 112, refers to the map shown in FIG. 4 to determine the time constant according to the vehicle speed (vehicle body speed v) (step S3), and filters the slip ratio δ calculated in step S2 based on the determined time constant (step S4). Thereafter, the CPU 101, which functions as the driving force control unit 113, controls the driving force transmission device 2 based on the smoothed slip ratio δ' obtained by the filtering (step S5). Processing in the single control period is thus completed.

In step S5, the CPU 101 calculates command torque based on a plurality of index values indicating the traveling state of the vehicle, which include the slip ratio δ, and continuously supplies an excitation current according to the calculated command torque to the electromagnetic coil 53 of the driving force transmission device 2 until the CPU 101 calculates new command torque in step S5 of the following control period. For example, the plurality of index values include the steering angle φ and the amount by which the accelerator peal 110 is depressed.

According to the first embodiment described above, when the vehicle is traveling at low speeds at which a calculation error in the slip ratio δ tends to be large, such as when the vehicle is traveling at less than 10 km/h, the control device 10 can control the driving force transmission device 2 based on the slip ratio δ and distribute an appropriate driving force to the right and left rear wheels 192, 191. The reason why a large calculation error in the slip ratio δ is caused when the vehicle is traveling at low speeds is that, when the vehicle is traveling at low speeds, the wheel speeds ω1, ω2, which are the numerators of the fractions in the above expressions (1), (2), are small and a small error in the wheel speeds ω1, ω2 causes a significant change in slip ratios δ1, δ2. In the present embodiment, a larger time constant is used for filtering at low vehicle speeds than for filtering at medium or high vehicle speeds, which restrains the driving force that is transmitted to the right and left rear wheels 192, 191 from varying significantly due to a calculating error of the slip ratio δ. This ensures driving stability of the four-wheel drive vehicle 1.

A second embodiment of the present invention will be described with reference to FIGS. 6 and 7. The second embodiment is similar to the first embodiment except for a process that is executed by the CPU 101 of the control device 10 which functions as the smoothing unit 112. Accordingly, the differences from the first embodiment will be mainly described below.

Figure 6:
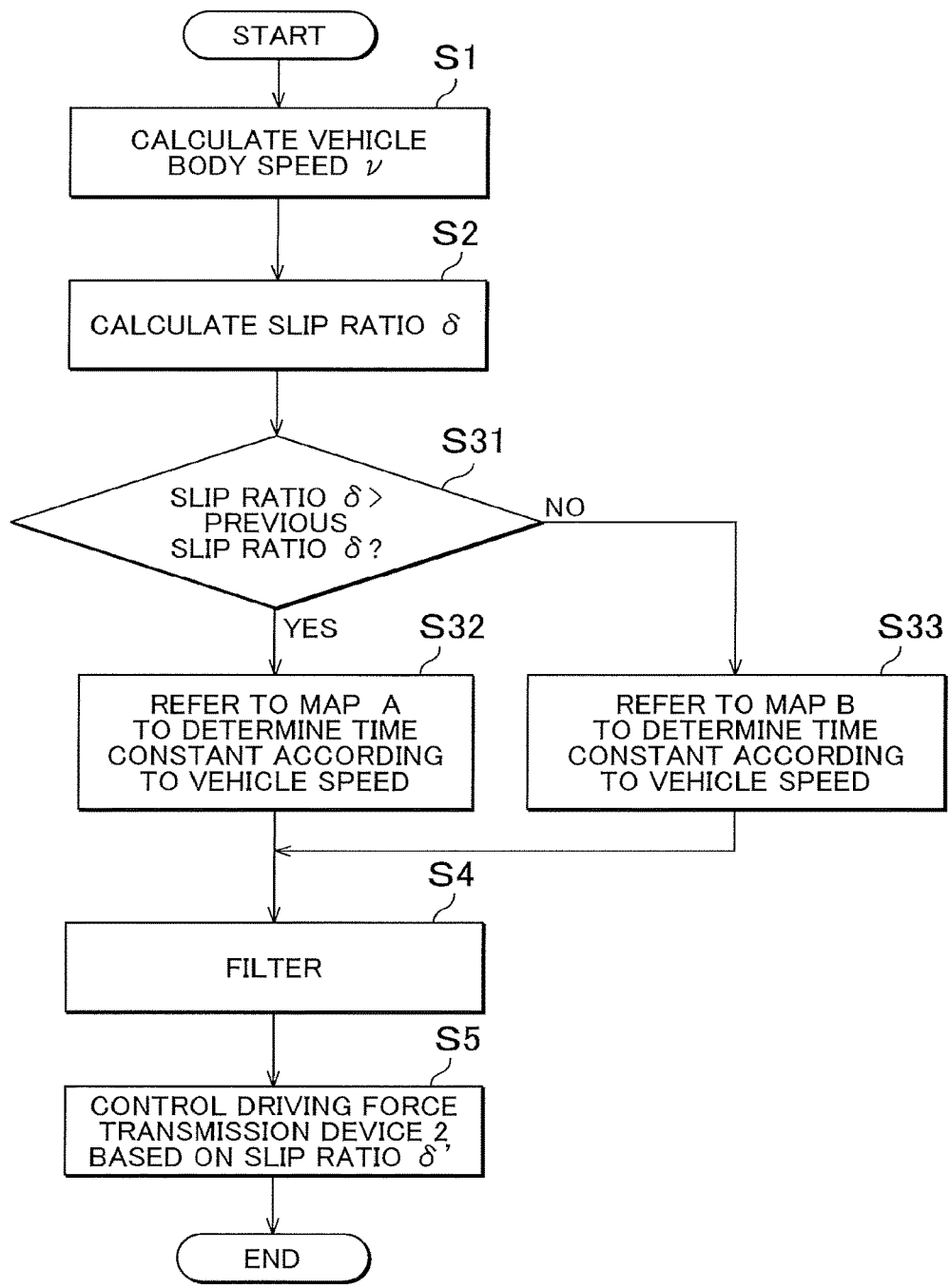
FIG. 6 is a flowchart showing the processing procedure according to a second embodiment.

FIG. 6 is a flowchart showing in steps S31 to S33 a process that is executed by the smoothing unit 112 according to the second embodiment. In this flowchart, processing similar to that described in the first embodiment with reference to FIG. 5 is denoted with the same step numbers and description thereof will be omitted. The smoothing unit 112 according to the second embodiment performs filtering by using different time constants depending on whether the slip ratio δ obtained by the slip ratio calculating unit 111 is increasing or decreasing, at least in a part of a vehicle speed range.

Figure 7:
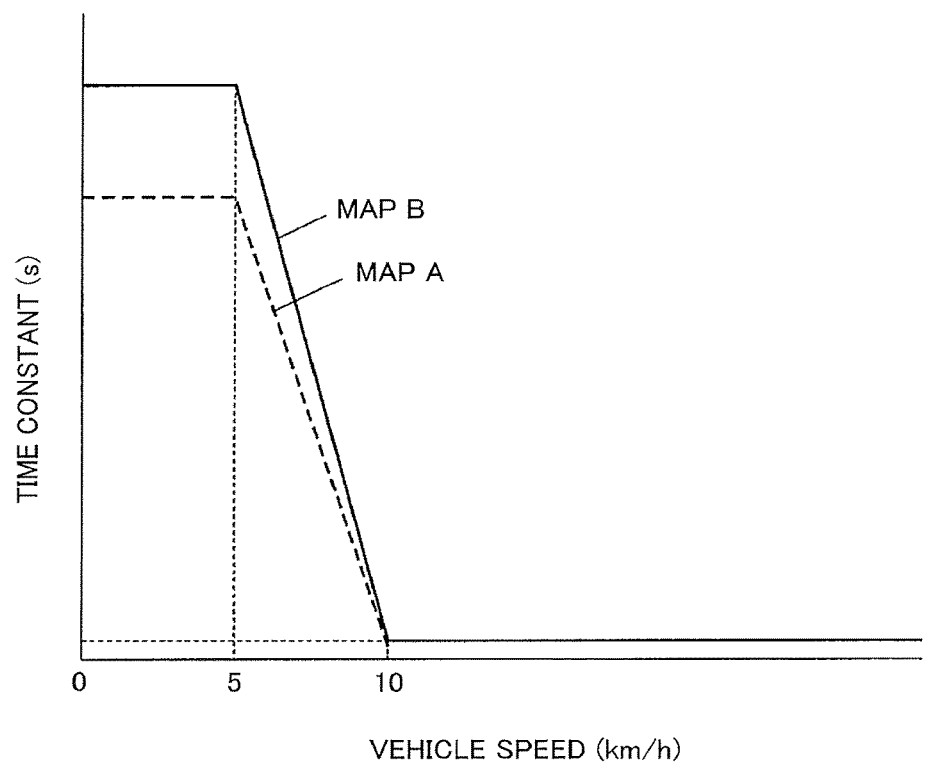
FIG. 7 is a graph showing an example of the relationship between the time constant for filtering that is performed by a smoothing unit and the vehicle speed according to the second embodiment.

FIG. 7 is a graph showing an example of the relationship between the time constant for filtering that is performed by the smoothing unit 112 and the vehicle speed according to the second embodiment. This graph shows an example in which the smoothing unit 112 uses a smaller time constant for the filtering when the slip ratio δ obtained by the slip ratio calculating unit 111 is increasing than when the slip ratio δ is decreasing. In FIG. 7, dashed line shows the relationship between the time constant and the vehicle speed when the slip ratio δ is increasing, and continuous line shows the relationship between the time constant and the vehicle speed when the slip ratio δ is decreasing. Hereinafter, the relationship between the time constant and the vehicle speed, which is shown by dashed line, is referred to as Map A, and the relationship between the time constant and the vehicle speed, which is shown by continuous line, is referred to as Map B.

In Maps A, B, the time constant is constant at the same value when the vehicle speed is equal to or higher than a first predetermined value that is 10 km/h. When the vehicle speed is less than the first predetermined value, the time constant to be used when the slip ratio δ is increasing is smaller than the time constant to be used when the slip ratio δ is decreasing. When the vehicle speed is less than a second predetermined value that is 5 km/h, the time constant is constant in both of Maps A, B, but the time constant in Map A is smaller than the time constant in Map B. When the vehicle speed is less than the first predetermined value and is equal to or higher than the second predetermined value, the time constant changes at a fixed rate.

In the present embodiment, the smoothing unit 112 determines if the slip ratio δ calculated in step S2 is higher than the slip ratio δ calculated in the previous control period (step S31). If the determination result is Yes, that is, if the slip ratio δ is increasing, the smoothing unit 112 refers to Map A to determine the time constant according to the vehicle speed (step S32). If the determination result is No, that is, if the slip ratio δ is decreasing or constant, the smoothing unit 112 refers to Map B to determine the time constant according to the vehicle speed (step S33). The smoothing unit 112 then filters the slip ratio δ based on the time constant determined in step S32 or S33 (step S4).

The second embodiment described above has the following advantageous effects in addition to the advantageous effects of the first embodiment. When the vehicle speed is less than the first predetermined value, the smoothing unit 112 performs the filtering by using different time constants depending on whether the slip ratio δ obtained by the slip ratio calculating unit 111 is increasing or decreasing. This increases flexibility in adjusting driving characteristics of the four-wheel drive vehicle 1. Namely, this facilitates improvement in driving stability of the four-wheel drive vehicle 1.

In the case where Maps A, B are set as shown in FIG. 7, the time constant is smaller when the amount of slip of one or both of the right and left front wheels 182, 181 is increasing than when the amount of slip of the right and left front wheels 182, 181 is decreasing. Accordingly, when the amount of slip of one or both of the right and left front wheels 182, 181 is increasing, the smoothed slip ratio δ' obtained by filtering changes quickly. An increase is amount of slip of the right and left front wheels 182, 181 can thus be reliably restrained.

Modifications can be made to the present invention as appropriate without departing from the spirit and scope of the invention. For example, the configuration of the driving force transmission system of the four-wheel drive vehicle 1 is not limited to that shown in FIG. 1. The present invention is applicable to four-wheel drive vehicles with various configurations as long as a driving force that is transmitted to auxiliary driving wheels can be adjusted by a driving force transmission device.

What is claimed is:

1. A control device for a driving force transmission device which is mounted on a four-wheel drive vehicle having a main driving wheel to which a driving force of a driving source is constantly transmitted and an auxiliary driving wheel to which the driving force of the driving source is adjustably transmitted according to a traveling state of the vehicle via the driving force transmission device, and which controls the driving force transmission device, comprising:
    a slip ratio calculating unit that obtains a slip ratio of the main driving wheel based at least on a wheel speed of the main driving wheel;
    a smoothing unit that performs filtering to smooth the slip ratio obtained by the slip ratio calculating unit; and
    a driving force control unit that controls the driving force transmission device so that the driving force that is transmitted to the auxiliary driving wheel increases as the slip ratio smoothed by the smoothing unit increases, wherein
    the smoothing unit uses a larger time constant for the filtering when a vehicle speed is less than a predetermined value than when the vehicle speed is equal to or higher than the predetermined value.

2. The control device for the driving force transmission device according to claim 1, wherein
    the smoothing unit performs the filtering by using different time constants depending on whether the slip ratio obtained by the slip ratio calculating unit is increasing or decreasing, at least in a part of a vehicle speed range.

* * * * *